(12) United States Patent
Ayarturk

(10) Patent No.: US 12,060,862 B2
(45) Date of Patent: Aug. 13, 2024

(54) ELECTRICITY GENERATION SYSTEM

(71) Applicant: REPG ENERJI SISTEMLERI SANAYI VE TICARET ANONIM SIRKETI, Bursa (TR)

(72) Inventor: Hasan Ayarturk, Istanbul (TR)

(73) Assignee: REPG ENERJI SISTEMLERI SANAYI VE TICARET ANONIM SIRKETI, Bursa (TR)

( * ) Notice: Subject to any disclaimer, the term of this patent is extended or adjusted under 35 U.S.C. 154(b) by 0 days.

(21) Appl. No.: 18/045,000

(22) PCT Filed: Aug. 13, 2021

(86) PCT No.: PCT/TR2021/050807
§ 371 (c)(1),
(2) Date: Mar. 13, 2023

(87) PCT Pub. No.: WO2022/060326
PCT Pub. Date: Mar. 24, 2022

(65) Prior Publication Data
US 2023/0358204 A1    Nov. 9, 2023

(30) Foreign Application Priority Data

Sep. 15, 2020  (TR) ................................ 2020/14603

(51) Int. Cl.
*F03B 17/06* (2006.01)
*H02K 7/18* (2006.01)

(52) U.S. Cl.
CPC ........... *F03B 17/06* (2013.01); *H02K 7/1823* (2013.01)

(58) Field of Classification Search
CPC ....... F03B 17/06; H02K 7/1823; F03G 7/015; Y02E 10/30
See application file for complete search history.

(56) References Cited

U.S. PATENT DOCUMENTS

| 6,185,940 B1* | 2/2001 | Prueitt ................. B01D 61/10 60/649 |
| 9,863,405 B2 | 1/2018 | Sano et al. |
| 2014/0138956 A1 | 5/2014 | Sano et al. |
| 2015/0249378 A1* | 9/2015 | Sano ................... B01D 63/082 290/52 |

FOREIGN PATENT DOCUMENTS

| JP | 2015001209 A | 1/2015 |
| JP | 2015001227 A | 1/2015 |

* cited by examiner

*Primary Examiner* — Joseph Ortega
(74) *Attorney, Agent, or Firm* — Bayramoglu Law Offices LLC

(57) ABSTRACT

A system includes a power generator which provides solvent passage from one of the liquids to the other liquid by means of an osmotic membrane provided between liquids taken to a first volume and to a second volume and having different densities and which provides increasing of the pressure of the liquid to which the solvent passage occurs and which provides generation of electricity from the formed pressure. Accordingly, the system includes a first regeneration unit and a second regeneration unit, a retaining chamber, a valve unit, a first density sensor, a second density sensor, and a control unit. The control unit is configured to determine the liquid having high density in accordance with the measurements taken and to determine the operation mode of the valve unit accordingly.

3 Claims, 2 Drawing Sheets

ELECTRICITY GENERATION SYSTEM

CROSS REFERENCE TO THE RELATED APPLICATIONS

This application is the national phase entry of International Application No. PCT/TR2021/050807, filed on Aug. 13, 2021, which is based upon and claims priority to Turkish Patent Application No. 2020/14603, filed on Sep. 15, 2020, the entire contents of which are incorporated herein by reference.

TECHNICAL FIELD

The present invention relates to a system including a power generator which provides solvent passage from one of the liquids to the other liquid by means of an osmotic membrane provided between liquids taken to a first volume and to a second volume and having different densities and which provides increasing of the pressure of the liquid to which the solvent passage occurs and which provides generation of electricity from the formed pressure.

BACKGROUND

Energy can be generated by means of osmosis principle, in other words, energy can be generated by providing movement of the main movement source by using the flow rate increase which results from solvent transfer of liquids which have different solute densities. In more details, when a liquid having high solute and a liquid having low solute are passed through two chambers which are separated by means of a selective permeable membrane, solvent flow occurs from the liquid having low solute to the liquid having high solute and thus, the flow rate of the liquid having high solute increases and this increasing flow rate is transformed into electrical energy by the generator driven by means of turbine. These systems continuously need liquid having low solute and liquid having high solute. The liquid having high solute can be sea water and the liquid having low solute can be clean water. Since liquid having low solute, in other words, clean water is needed for functioning, and the usage areas are limited and costly.

In the Japanese application with number JP2015001209, a system is described which generates electricity in a similar manner to the abovementioned description.

In the American application with number US2014138956, a system is described which uses sea water as the source. In both solutions, systems need uninterrupted addition of liquid having high solute and liquid having low solute.

As a result, because of the abovementioned problems, an improvement is required in the related technical field.

SUMMARY

The present invention relates to a system for electricity generation, for eliminating the abovementioned disadvantages and for bringing new advantages to the related technical field.

An object of the present invention is to provide a system which generates electricity by utilizing density difference of liquids and which eliminates the need for uninterrupted liquid having low solute and liquid having high solute.

Another object of the present invention is to provide a system where the amount of energy consumed is reduced while electricity is being generated.

In order to realize the abovementioned objects and the objects which are to be deducted from the detailed description below, the present invention is a system including a power generator which provides solvent passage from one of the liquids to the other liquid by means of an osmotic membrane provided between liquids taken to a first volume and to a second volume and having different densities and which provides increasing of the pressure of the liquid to which the solvent passage occurs and which provides generation of electricity from the formed pressure. Accordingly, the subject matter system includes a first regeneration unit and a second regeneration unit embodied to provide equalization of the vapor pressure of the liquid accommodated therein to the vapor pressure of air; a retaining chamber hydraulically connected to the second regeneration unit in order to transfer the liquid obtained by the second regeneration unit by time; a valve unit which operates in a first operation mode where said first regeneration unit and the first volume of the power generator are hydraulically connected and the retaining chamber and the second volume of the power generator are hydraulically connected selectively and in a second operation mode where the first regeneration unit and the second volume of the power generator are hydraulically connected and the retaining chamber and the first volume of the power generator are hydraulically connected; a first density sensor provided between the first regeneration unit and the valve unit, a second density sensor provided between the retaining chamber and the valve; a control unit configured to take the measurements made by said first density sensor and said second density sensor and to control operation of the valve unit; and said control unit is configured to determine the liquid having high density in accordance with the measurements taken and to determine the operation mode of the valve unit accordingly. Thus, the densities of the first regeneration unit and the retaining chamber are different since the form of the liquid which is equalized with the vapor pressure of the air at different hours of the day is kept in the retaining chamber and is taken into use afterwards. Therefore, energy is generated by using this difference. Only one type of liquid is used and thereby, for instance, continuous sea water and clean water usage need is eliminated and electricity can be generated by means of only sea water.

In a possible embodiment of the present invention, a liquid pump is provided between the valve unit and the first volume of the power generator.

In another possible embodiment of the present invention, the power generator includes an ejector which is in venturi type for providing applying of suction power on the liquid which exists in the chamber with low pressure when it is driven by the liquid which exists in the chamber with high pressure and for providing accelerating of the liquid which exists in the chambers with low pressure and with high pressure and for providing sending thereof to the first regeneration unit and to the second regeneration unit. Thus, liquid is carried without consuming additional energy.

REFERENCE NUMBERS

Figure 1:
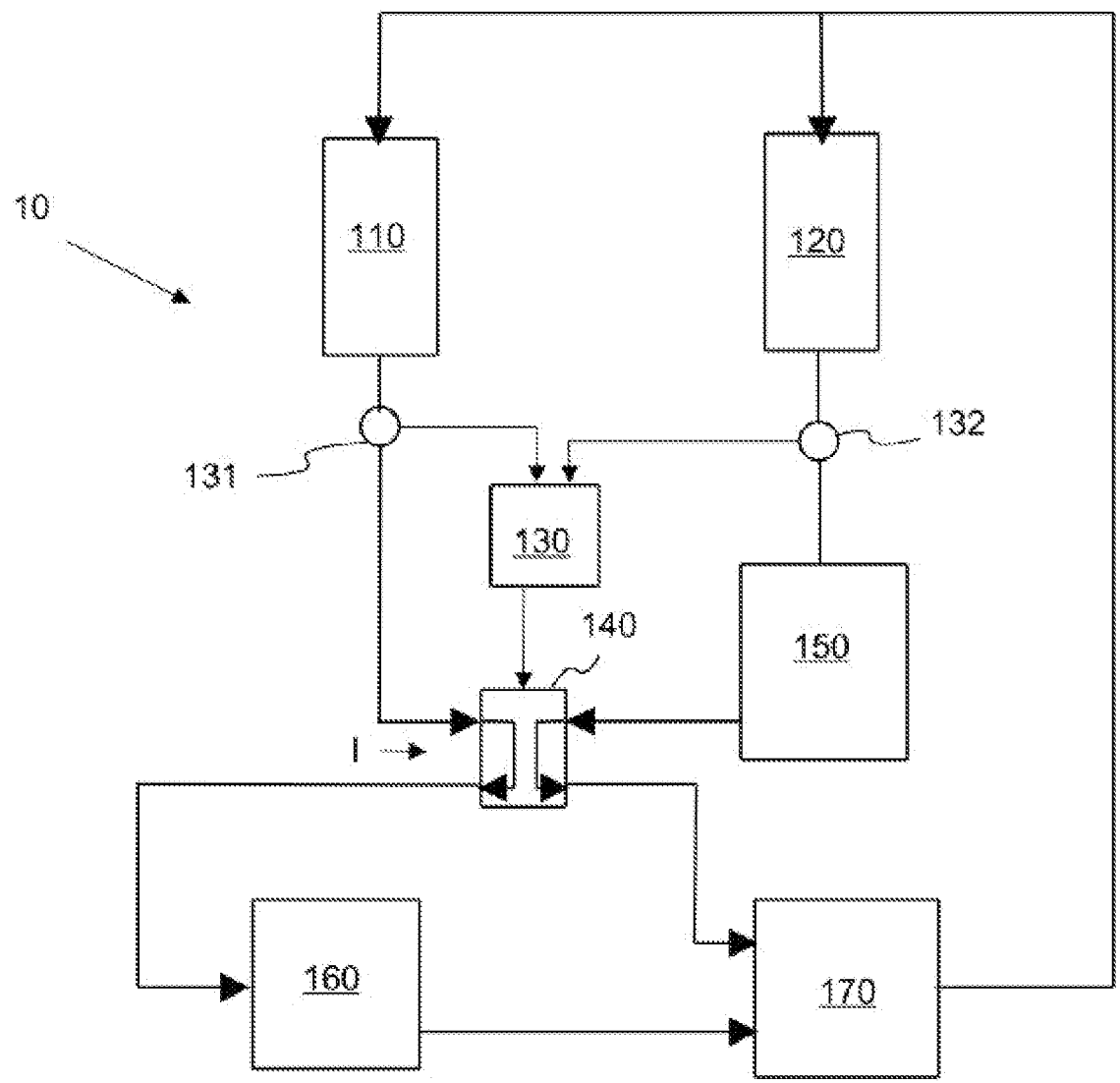
In FIG. 1, a representative view of the operation of the system while the valve is in the first operation mode is given.
Figure 2:
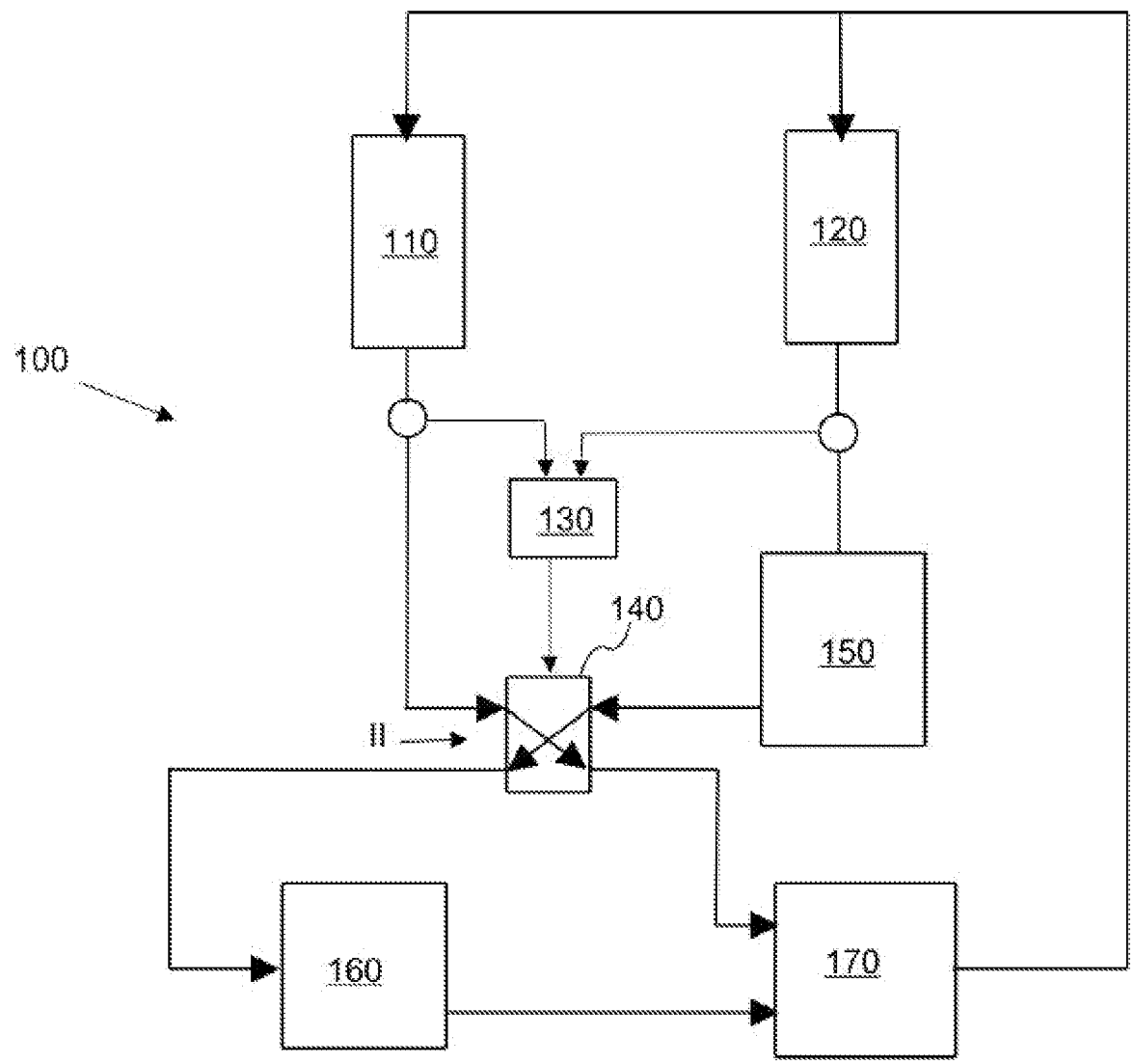
In FIG. 2, a representative view of the operation of the system while the valve is in the second operation mode is given.

100 System
110 First regeneration unit
120 Second regeneration unit
130 Control unit
131 First density sensor
132 Second density sensor
140 Valve unit
   I First operation mode
   II Second operation mode
150 Retaining chamber
160 Liquid pump
170 Power generator

DETAILED DESCRIPTION OF THE EMBODIMENTS

In this detailed description, the subject matter is explained with references to examples without forming any restrictive effect only in order to make the subject more understandable.

The present invention is essentially a system (100) which provides usage of humidity, which exists in the air, for decreasing or increasing the density of a liquid since air has different vapor pressures at different times and which provides obtaining forms of a liquid at different densities and which provides generation of electricity from these.

With reference to FIG. 1, the system (100) includes a first regeneration unit (110) and a second regeneration unit (120) which provides equalization of vapor pressure of a liquid to the vapor pressure of the air which exists in the medium. The first regeneration unit (110) and the second regeneration unit (120) can be cooling towers known in the art. The second regeneration unit (120) is hydraulically connected to a retaining chamber (150). There is a retaining chamber (150) which is associated with the second regeneration unit and wherein the liquid is kept which is obtained in a manner where the vapor pressure obtained in the second regeneration unit (120) is equal to the vapor pressure of the air which exists in the medium at the instant where regeneration process is realized. The retaining chamber (150) provides access to the forms of the liquid, which have different densities, at the same instant. For instance, the liquid obtained between 22.00-02.00 at night is kept in the retaining chamber (150). When this liquid is used between 08.00 and 12.00 during the day, the density of the liquid obtained by the first regeneration unit (110) between these hours is different from the density of the liquid obtained and kept between 20.00-02.00.

The system includes a power generator (170). Said power generator (170) is configured to provide solvent passage from one of the liquids to the other liquid by means of an osmotic membrane provided between liquids taken into a first volume and into a second volume and having different densities and to provide increasing of the pressure of the liquid to which the solvent passage occurs and to provide generation of electricity from the formed pressure. The power generator (170) can also include a turbine. The power generator (170) includes an ejector which is in venturi type for providing applying of suction power on the liquid which exists in the chamber with low pressure when it is driven by the liquid which exists in the chamber with high pressure and for providing accelerating of the liquid which exists in the chambers with low pressure and with high pressure and for providing sending thereof to the first regeneration unit (110) and to the second regeneration unit (120).

The system (100) includes a valve unit (140) which operates in a first operation mode (I) where said first regeneration unit (110) and the first volume of the power generator (170) are hydraulically connected and the retaining chamber (150) and the second volume of the power generator (170) are hydraulically connected selectively and in a second operation mode (II) where the first regeneration unit (110) and the second volume of the power generator (170) are hydraulically connected and the retaining chamber (150) and the first volume of the power generator (170) are hydraulically connected. The valve unit (140) can include 4-directional valve or can include pluralities of valves connected to each other by means of channels.

The system moreover includes a first density sensor (131) provided between the first regeneration unit (110) and the valve unit (140), and a second density sensor (132) provided between the retaining chamber (150) and the valve unit (140). The density sensor can be a sensor which senses the conductance of liquid.

A control unit (130) controls operation of the valve unit (140) at the first operation mode (I) or at the second operation mode (II) with respect to the measurements received from the first density sensor (131) and the second density sensor (132).

In a possible embodiment of the present invention, the system (100) can include a liquid pump (160) provided between the valve unit (140) and the first volume of the power generator (170). The liquid pump (160) provides acceleration of the low density liquid.

The operation of the system (100) is realized as follows. The first regeneration unit (110) and the second regeneration unit (120) provide equalization of the gas pressure of the liquid thereof to the air gas pressure. The liquid obtained beforehand by the second regeneration unit (120) is kept in the retaining chamber (150). For instance, when the relative humidity is low during the day, the liquids evaporate and the densities increase, and when the relative humidity is high at night, the density of the liquids decreases. Since liquid obtained at a relative humidity which is different from the present relative humidity ratio is kept in the retaining chamber (150), the density of the liquid obtained by the first regeneration unit (110) and the density of the liquid kept in the retaining chamber (150) are different. For instance, the control unit (130) detects that the density of the liquid, which exists in the first regeneration unit (110) for the day time, is higher than the density of the liquid, which exists in the retaining chamber (150), in accordance with the measurements received from the first density sensor (131) and the second density sensor (132), and the control unit (130) provides the valve unit (140) to operate in the first operation mode (I). When the relative humidity increases at night, while low density liquid is obtained in the first regeneration unit (110), the high density liquid, which remains from the daytime, exists in the retaining chamber (150). In this case, the control unit (130) detects that the density of the liquid, obtained from the first regeneration unit (110), is higher than the density of the liquid, which exists in the retaining chamber (150), and the control unit (130) provides operation of the valve unit (140) in the second operation mode (II). Thus, liquid which has higher density exists in the first volume of the power generator (170) when compared with the liquid which exists in the second volume, and the continuity of the system (100) is provided.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A system comprising a power generator, wherein the power generator provides a solvent passage from a first one of liquids to a second one of the liquids by means of an osmotic membrane, wherein the osmotic membrane is provided between the liquids taken to a first volume and to a second volume and having different densities, and the power generator provides an increasing of a pressure of the liquid, wherein the solvent passage occurs to the liquid and the power generator provides a generation of electricity from the pressure, wherein the system comprises a first regeneration unit and a second regeneration unit configured to provide an equalization of a vapor pressure of the liquid accommodated in the first regeneration unit and the second regeneration unit to a vapor pressure of an air; a retaining chamber hydraulically connected to the second regeneration unit in order to transfer the liquid obtained by the second regeneration unit by time;

a valve unit, wherein the valve unit operates in a first operation mode, wherein the first regeneration unit and the first volume of the power generator are hydraulically connected and the retaining chamber and the second volume of the power generator are hydraulically connected selectively, and the valve unit operates in a second operation mode, wherein the first regeneration unit and the second volume of the power generator are hydraulically connected and the retaining chamber and the first volume of the power generator are hydraulically connected;

a first density sensor provided between the first regeneration unit and the valve unit, a second density sensor provided between the retaining chamber and the valve unit;

a control unit configured to take measurements made by the first density sensor and the second density sensor and to control an operation of the valve unit; and the control unit is configured to determine the liquid having a high density in accordance with the measurements taken and to determine the first or second operation mode of the valve unit accordingly.

2. The system according to claim 1, wherein a liquid pump is provided between the valve unit and the first volume of the power generator.

3. The system according to claim 1, wherein the power generator comprises an ejector, wherein the ejector is in a venturi type for providing an applying of a suction power on the liquid, wherein the liquid exists in the retaining chamber with a low pressure when the ejector is driven by the liquid, wherein the liquid exists in the retaining chamber with a high pressure, and the ejector is for providing an accelerating of the liquid, wherein the liquid exists in the retaining chambers with the low pressure and with the high pressure, and the ejector is for providing a sending thereof to the first regeneration unit and to the second regeneration unit.

* * * * *